United States Patent
Mizutani et al.

[11] Patent Number: 5,892,333
[45] Date of Patent: Apr. 6, 1999

[54] ELECTROLUMINESCENT DEVICE AND METHOD FOR PRODUCING THE SAME

[75] Inventors: Atsushi Mizutani, Anjo; Masayuki Katayama, Handa; Nobuei Ito, Chiryu; Tadashi Hattori, Okazaki, all of Japan

[73] Assignee: Denso Corporation, Kariya, Japan

[21] Appl. No.: 740,666

[22] Filed: Oct. 31, 1996

[30] Foreign Application Priority Data

Nov. 1, 1995 [JP] Japan .................................. 7-285359

[51] Int. Cl.⁶ .............. H01J 1/62; H05B 33/00; H05B 33/14
[52] U.S. Cl. ............. 313/506; 313/502; 313/503; 313/506; 313/507
[58] Field of Search ........................ 313/502, 503, 313/504, 505, 506, 507, 509

[56] References Cited

U.S. PATENT DOCUMENTS

| | | | |
|---|---|---|---|
| 5,309,070 | 5/1994 | Sun et al. ................................ | 313/503 |
| 5,598,059 | 1/1997 | Sun et al. ............................ | 313/503 X |
| 5,635,307 | 6/1997 | Takeuchi et al. .................... | 313/502 X |
| 5,643,829 | 7/1997 | Kang ................................... | 313/502 X |
| 5,656,888 | 8/1997 | Sun et al. ............................... | 313/503 |
| 5,677,594 | 10/1997 | Sun et al. ............................. | 313/502 X |
| 5,700,592 | 12/1997 | Mueller et al. ..................... | 313/503 X |
| 5,747,929 | 5/1998 | Kato et al. .............................. | 313/503 |

FOREIGN PATENT DOCUMENTS

| | | |
|---|---|---|
| 1-183092 | 7/1989 | Japan . |
| 2-72592 | 3/1990 | Japan . |

OTHER PUBLICATIONS

Japan Display '92 pp. 725–728, S19–4 White Light Emitting Electroluminescent Devices with (SrS:Ce/ZnS:Mn) Multi-layered Thin Films, K. Ohmi et al.

SID 95 Digest pp. 728–731, 32.5/Smith, 32.5: Late–News Paper: Crystalline–as–Deposited CaGa2S4:Ce via Low–Temperature Metal–Organic Chemical Vapor Deposition, D.C. Smith et al.

*Primary Examiner*—Nimeshkumar Patel
*Assistant Examiner*—Mack Haynes
*Attorney, Agent, or Firm*—Pillsbury Madison & Sutro LLP

[57] ABSTRACT

A luminescent layer in an EL device composed of $CaGa_2S_4$:Ce includes a first luminescent layer and a second luminescent layer. The first luminescent layer has an atomic ratio of Ga to Ca being higher than that in the second luminescent layer, and directly disposed on a first insulating layer, whereby delamination can be prevented. The atomic ratio of Ga to Ca in the second luminescent layer is approximately equal to a stoichiometric ratio, so that the threshold voltage of the EL device can be kept low.

11 Claims, 9 Drawing Sheets

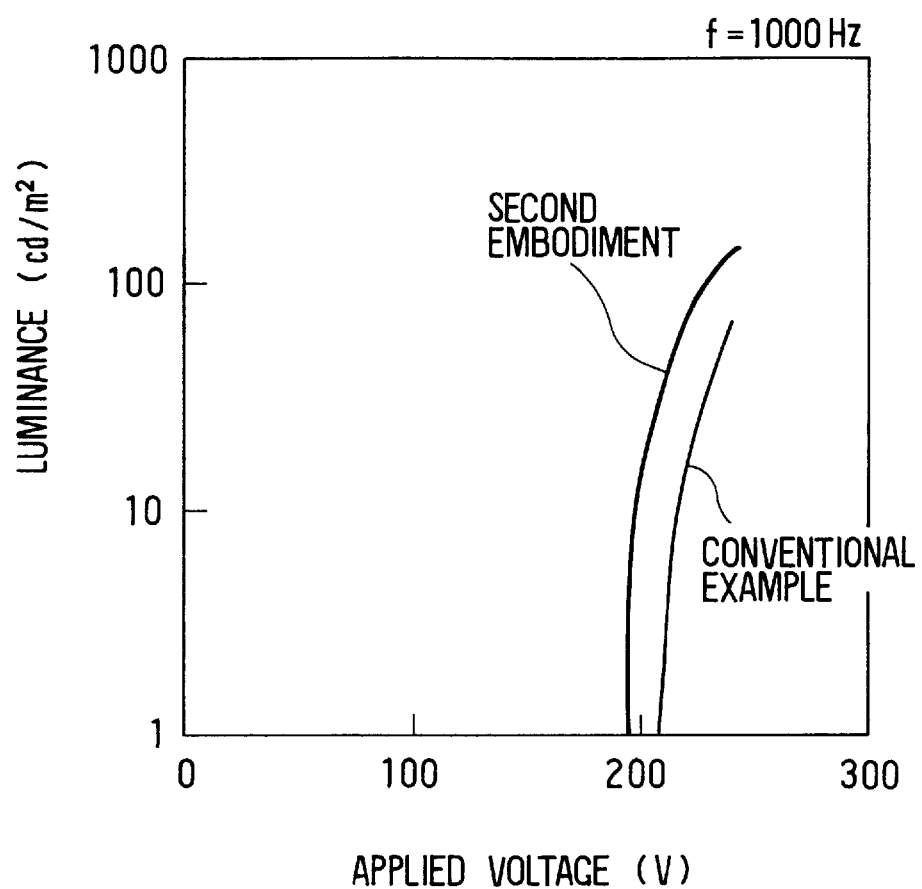

ELECTROLUMINESCENT DEVICE AND METHOD FOR PRODUCING THE SAME

CROSS REFERENCE TO RELATED APPLICATION

This application is based upon and claims the benefit of priority of the prior Japanese Patent Application No. 7-285359 filed on Nov. 1, 1995, the content of which is incorporated herein by reference.

BACKGROUND OF THE INVENTION

1. Field of the Invention

The present invention relates to electroluminescent (hereinafter referred to as EL) devices which are used in various instruments of, for example, emissive-type segment displays and matrix displays, and in displays in various information terminals. The present invention also relates to methods for producing the same.

2. Related Arts

An EL device is typically formed by laminating a first electrode, a first insulating layer, an luminescent layer, a second insulating layer, and a second electrode on an insulating glass substrate in this order, and the layers at least on one side of the luminescent layer are made of transparent materials.

The luminescent layer is composed of a host material doped with a luminescent center, and various luminous materials are previously proposed. Especially, a luminescent layer capable of emitting blue light, including an alkaline earth thiogallate (MGa2S4, M=Ca, Sr, Ba) as the host material doped with cerium (Ce) as the luminescent center, is known. The alkaline earth thiogallate luminescent layer is deposited by a sputtering method.

However, in the case that the alkaline earth thiogallate layer formed by the sputtering method is independently used as the luminescent layer in the EL device, there occurs a problem that the luminescent layer is liable to peel off during thermal annealing after the luminescent layer is deposited. The delamination results in a decline in the breakdown voltage of the EL device, and the breakdown of the EL device starts at some tens volts over a threshold voltage. Therefore, reliability of the EL device is lowered.

As opposed to this, an EL device including an alkaline earth thiogallate luminescent layer deposited by sputtering and interposed between a pair of zinc sulfide (ZnS) layers to prevent delamination is disclosed in JP-A-5-65478.

The ZnS layers, however, do not contribute to the luminescent process, and the threshold voltage of the EL devices is increased by the ZnS layers.

SUMMARY OF THE INVENTION

The present invention has been accomplished in view of the above-mentioned problems and an object of the present invention is to provide an EL device including a luminescent layer composed of a II-III-VI compound, such as an alkaline earth thiogallate, as a host material, while preventing delamination of the luminescent layer without increasing the threshold voltage of the EL device.

According to the present invention, an EL device is composed of a substrate, a first electrode disposed on the substrate, a second electrode, a luminescent layer disposed between the first and the second electrodes and composed of a II-III-VI compound acting as a host material, and first and second insulating layers respectively disposed between the luminescent layer and the first electrode, and between the luminescent layer and the second electrode. In the EL device, the luminescent layer includes a first luminescent layer disposed on the first insulating layer, and a second luminescent layer doped with a material acting as a luminescent center. Further, an atomic ratio of an element of the group III to an element of the group II, i.e., III/II atomic ratio, in the first luminescent layer is higher than that in the second luminescent layer.

By providing two luminescent layers thus made, delamination between the first insulating layer and the first luminescent layer can be prevented. The reason for this would be that the difference of stresses between the first insulating layer and the luminescent layer is released. Further, the second insulating layer, the III/II atomic ratio of which is lower than that in the first luminescent layer, prevents the threshold voltage of the EL device from increasing, and increases the luminance at the same time.

Preferably, the III/II atomic ratio in the second luminescent layer is approximately equal to a stoichiometric ratio.

The first luminescent layer needs not include the luminescent center. In the case that the first luminescent layer does not include the luminescent center, it results in high crystalinity of the luminescent layer.

Preferably, the first and second luminescent layers are composed of the same host material and the same luminescent center. More preferably, the host material is calcium thiogallate ($CaGa_2S_4$) and the luminescent center is cerium (Ce).

In this case, a preferable atomic ratio of Ga to Ca in the first luminescent layer is between 2.8 and 3.0, and a preferable atomic ratio of Ga to Ca in the second luminescent layer is between 2.1 and 2.3.

To constitute the II-III-VI compound, the element of the group II can be selected from the group consisting of calcium (Ca), strontium (Sr), barium (Ba) and zinc (Zn), and the element of the group III can be selected from the group consisting of gallium (Ga), aluminium (Al) and indium (In). Further, an element of the group VI can be selected from the group consisting of sulfur (S), selenium (Se) and tellurium (Te).

Further, as the luminescent center, an element selected from the group consisting of Ce, manganese (Mn) and europium (Eu) can be adopted.

The III/II atomic ratio in the first and second luminescent layers may be successively changed so that it becomes gradually higher toward the first insulating layer, whereby adhesive properties of the luminescent layer can be further improved.

The luminescent layers are deposited by a chemical vapor deposition method, and at that time, an atomic ratio of source gases of the group III element to the group II element is controlled, whereby the III/II atomic ratios in the first and second luminescent layer are controlled.

Other objects and features of the present invention will become more readily apparent from a better understanding of the preferred embodiments described below with reference to the following figures.

BRIEF DESCRIPTION OF THE DRAWINGS

FIG. 9 is a graph showing luminance versus applied voltage characteristics of the EL device in the second embodiment.

DETAILED DESCRIPTION OF THE PRESENTLY PREFERRED EMBODIMENTS

Embodiments according to the present invention will be described hereinunder with reference to the drawings.

Figure 1:
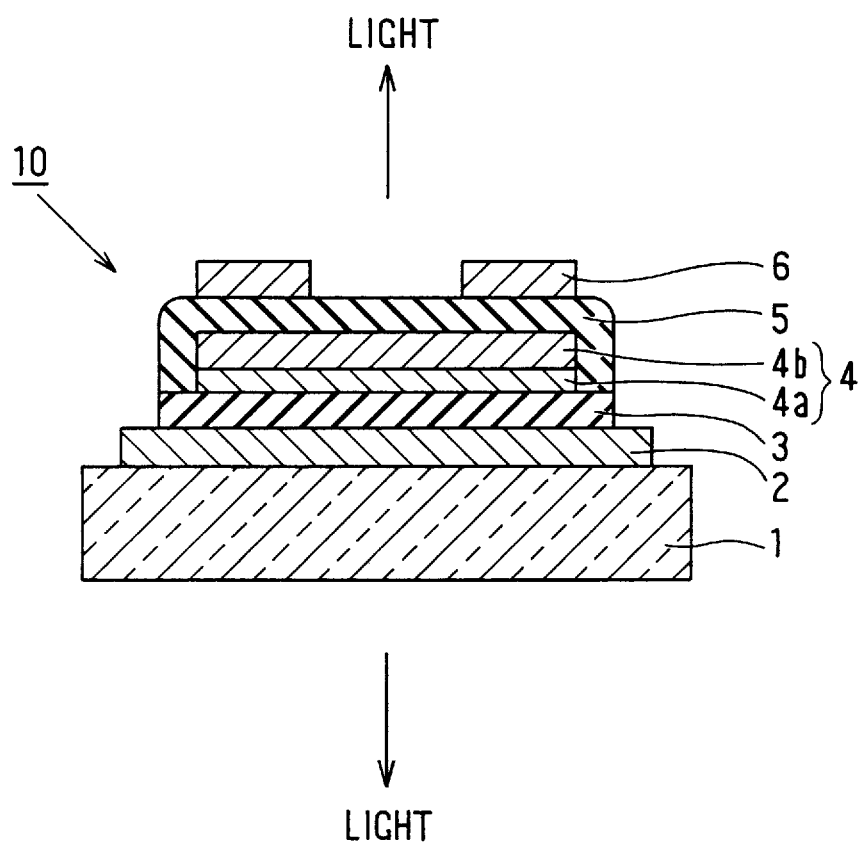
FIG. 1 is a cross-sectional view showing an EL device in a first embodiment according to the present invention.

A first embodiment will be described referring to FIG. 1 showing a cross-sectional view of an EL device 10. In the EL device 10 in FIG. 1, light is emitted in both directions, as shown by upward and downward arrows.

In the EL device 10, a first transparent electrode 2 (first electrode) made of optically transparent zinc oxide (ZnO) is formed on an insulating glass substrate 1, while a first insulating layer 3 made of optically transparent ditantalum pentaoxide ($Ta_2O_5$), a luminescent layer 4 made of calcium thiogallate doped with cerium as a luminescent center ($CaGa_2S_4$:Ce), a second insulating layer 5 made of $Ta_2O_5$, and a second transparent electrode 6 (second electrode) made of ZnO are formed on the first electrode 2 in this order. The $CaGa_2S_4$:Ce luminescent layer is composed of a luminescent layer 4a including an excess of gallium (Ga), and a luminescent layer 4b having an approximately proper stoichiometric composition.

The thickness of the transparent electrodes 2 and 6 is preferably 300 nm each, that of the insulating layers 3 and 5 is preferably 300 nm each, and that of the luminescent layer 4 is preferably 550 nm. Each thickness of the layers is measured at the center of the glass substrate 1.

The method for producing the thin film EL device 10 will be described below.

First, the first transparent electrode 2 is deposited on the glass substrate 1. An evaporation material is prepared from ZnO powder mixed with gallium oxide ($Ga_2O_3$) powder and then formed into a pellet. An ion plating system is used as a deposition system. The inside of a forming chamber of the ion plating system is evacuated while the glass substrate 1 is maintained at a constant temperature. Thereafter, an argon (Ar) gas is introduced into the chamber to maintain a constant pressure, and a beam current and an RF power are controlled so that a deposition rate is 6–18 nm/min.

Next, the first insulating layer 3 made of $Ta_2O_5$ is deposited on the first transparent electrode 2 by a sputtering method. A mixed gas including Ar and oxygen ($O_2$) is introduced into a sputtering device in which the glass substrate 1 is maintained at a constant temperature, thereafter the first insulating layer 3 is deposited with an RF power of 1 KW.

Next, the luminescent layers 4a and 4b made of $CaGa_2S_4$:Ce are deposited on the first insulating layer 3 by a metal organic chemical vapor deposition (MOCVD) method. The method for forming the luminescent layers 4a and 4b will be described in detail below.

First of all, the pressure in a forming chamber, in which the glass substrate 1 is set, is reduced to a pressure lower than $1\times10^{-6}$ Torr by a turbo molecular pump or the like. Thereafter, the pressure in the forming chamber is controlled at around 10 Torr by an automatic pressure control device while the temperature of the substrate 1 is kept at 600° C. As a raw material of calcium (Ca), bisdipivaloylmethanate calcium ($Ca(C_{11}H_{19}O_2)_2$) is used and a raw material vessel filled with $Ca(C_{11}H_{19}O_2)_2$ is maintained at a constant temperature of 225°±1° C. The reasons of using the $Ca(C_{11}H_{19}O_2)_2$ are that the sublimation temperature and the gasification temperature thereof are extremely low compared with chlorides or fluorides of Ca, and that the temperature control characteristic thereof is excellent.

The $Ca(C_{11}H_{19}O_2)_2$ is gasified and transported to a forming chamber with Ar carrier gas. The moisture in the Ar gas is sufficiently removed by a dehydration filter before the Ar gas is introduced into the raw material vessel.

As a raw material of Ga, triethylgallium ($Ga(C_2H_5)_3$) is used and filled into another raw material vessel. The temperature of the vessel is maintained at 18° C., so that the $Ga(C_2H_5)_3$ is gasified and introduced to the forming chamber with the Ar carrier gas. In addition to $Ga(C_2H_5)_3$, other organic compounds such as trimethylgallium ($Ga(CH_3)_3$) and tributylgallium ($Ga(C_3H_7)_3$) can be used as the raw material of Ga by controlling the temperature thereof.

An element of the group VI, sulfur (S), is introduced into the forming chamber as a source gas composed of hydrogen sulfide ($H_2S$) diluted with Ar. In addition to $H_2S$, dimethylsulfide ($S(CH_3)_2$), diethylsulfide ($S(C_2H_5)_2$), methylmercaptan ($S(CH_3)H$) and ethylmercaptan ($S(C_2H_5)H$) can be used as the source gas of S.

Further, to dope Ce as the luminescent center into the luminescent layer, tridipivaloylmethanate cerium (Ce $(C_{11}H_{19}O_2)_3$) is used as a raw material of Ce. A raw material vessel filled with $Ce(C_{11}H_{19}O_2)_3$ only is maintained at a constant temperature of 160° C., whereby the raw material is sublimated and gasified. The gasified $Ce(C_{11}H_{19}O_2)_3$ is transported into the forming chamber with Ar carrier gas.

The above mentioned source gases are introduced into the forming chamber in the order of $H_2S$, $Ga(C_2H_5)_3$, $Ca(C_{11}H_{19}O_2)_2$ and $Ce(C_{11}H_{19}O_2)_3$, thereby being pyrolytically decomposed and reacted. Accordingly, the $CaGa_2S_4$:Ce luminescent layer 4a including excessive Ga and S is formed on the first insulating layer 3 with a thickness of around 200 nm.

Next, the $CaGa_2S_4$:Ce luminescent layer 4b having the approximately stoichiometric composition is formed on the luminescent layer 4a. Here, an atomic ratio of Ga to Ca in the luminescent layer 4b is more than 2, and smaller than that in the luminescent layer 4a. The method for forming the luminescent layer 4b will be further described concretely.

The method for depositing the luminescent layer 4b is the same as that of the luminescent layer 4a, except for an amount of Ga which is to be supplied into the forming chamber. Therefore, the luminescent layer 4b can be deposited successively after the deposition of the luminesce layer 4a without stopping the formation process. The following methods are tested to decrease the amount of Ga to be supplied on the way of the formation process.

1. A flow rate of the carrier gas for transporting the Ga source gas is reduced.

2. Two vessels for the Ga raw material are used to change the temperature of the Ga raw material. That is, a high temperature vessel is used in the deposition of the luminescent layer 4a, and a low temperature vessel is used in the deposition of the luminescent layer 4b.

3. One vessel for the Ga raw material is used and the temperature of the Ga raw material is changed. That is, the temperature of the vessel is lowered in the deposition of the luminescent layer 4b after the luminescent layer 4a is formed.

In the above mentioned methods 1 and 2, a required luminescent layer was formed with a sufficient repeatability. As opposed to this, in the method 3, there were time variations in rising the temperature of the Ga raw material, whereby it was difficult to deposit the luminescent layer 4b with a required thickness.

In the deposition of the luminescent layer 4b, $Ca(C_{11}H_{19}O_2)_2$, $Ga(C_2H_5)_3$ and $Ce(C_{11}H_{19}O_2)_3$ are maintained and gasified at the temperature of 225° C., 9° C. and 160° C., respectively.

The gasified source gases are pyrolytically decomposed and reacted, whereby the luminescent layer 4b having an approximately stoichiometric composition is formed with a thickness of 350 nm.

Thereafter, the second insulating layer 5 made of $Ta_2O_5$ is deposited on the luminescent layer 4b by the same way as that of the first insulating layer 3. The second transparent electrode 6 made of ZnO is also deposited on the second insulating layer 5 by the same way as that of the first transparent electrode 2, whereby the EL device 10 in FIG. 1 is completed.

Figure 2:
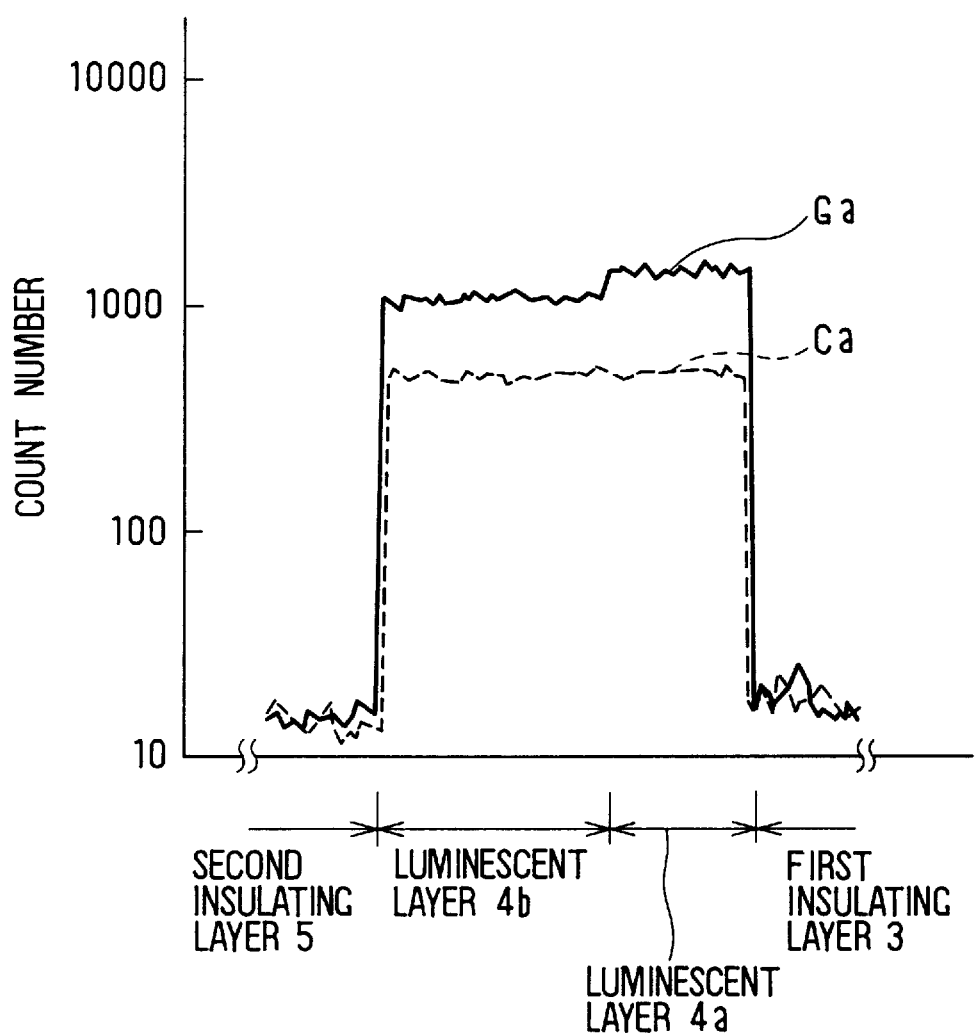
FIG. 2 is a graph showing amounts of Ga and Ca, analyzed by SIMS, in the EL device in the first embodiment.

The amounts of Ca and Ga in the luminescent layers 4a and 4b, which were analyzed by a secondary ion mass spectrometry (SIMS), are shown in FIG. 2. In FIG. 2, the vertical axis shows count numbers detected by the SIMS and the horizontal axis shows depths excavated by Ar sputtering from a surface of the EL device, whereby an atomic ratio of Ga to Ca with respect to the depth from the surface of EL device is shown. A solid line shows the amount of Ga and a broken line shows the amount of Ca.

According to the analysis, the atomic ratio of Ga to Ca, the Ga/Ca ratio, in the luminescent layer 4a was in the range of 2.8–3.0, and the Ga/Ca ratio in the luminescent layer 4b was in the range of 2.1–2.3. These variations are caused not only by the actual compositions in the layers but by the analysis deviation. In case that the Ga/Ca ratio is over 5, the luminance is decreased. Therefore, it is preferred that the Ga/Ca ratio in the luminescent layer 4 is in the range of 2–5.

Figure 3:
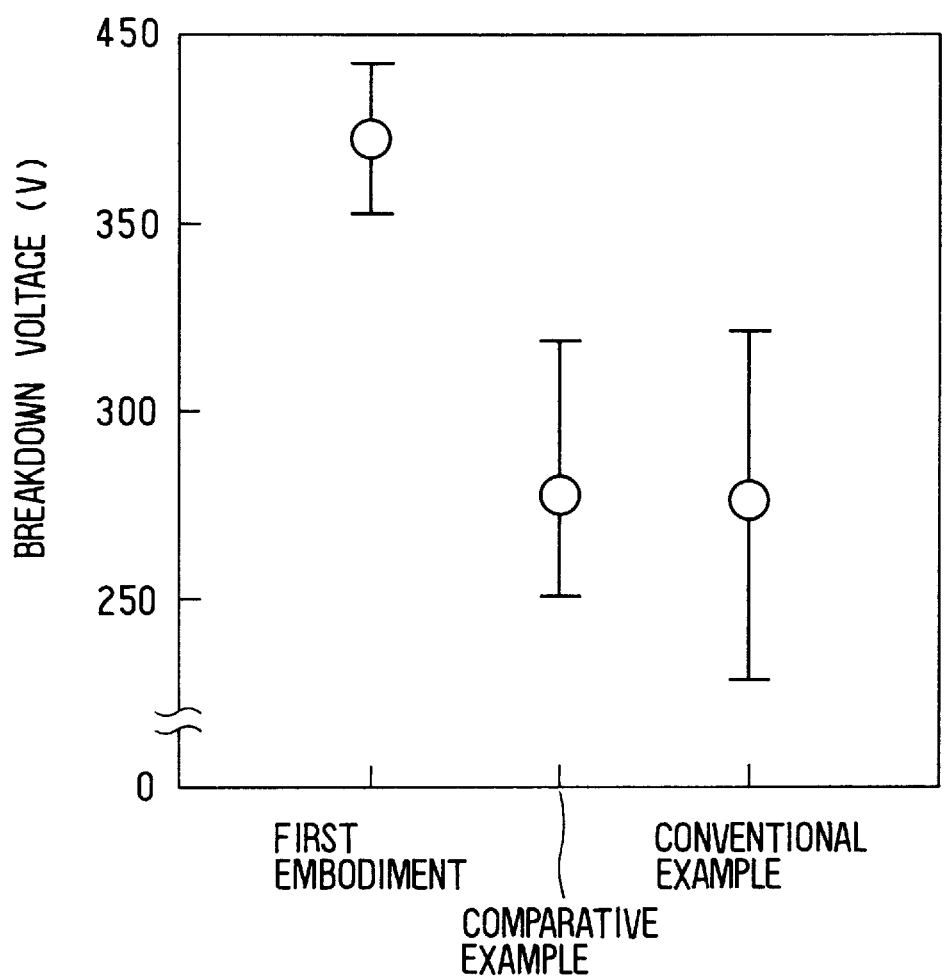
FIG. 3 is a graph showing breakdown voltages of the EL devices in the first embodiment in comparison with those in a comparative example and a conventional example.

The breakdown voltages of the EL devices 10 in the first embodiment are shown in FIG. 3 by contrast with a comparative example and a conventional example.

An EL device in the conventional example has a $CaGa_2S_4$:Ce luminescent layer deposited by the sputtering method with an approximately stoichiometric composition and sandwiched between two layers of ZnS. The upper ZnS layer is 150 nm thick and the lower ZnS layer is 80 nm thick. An EL device in the comparative example is deposited by the MOCVD method instead of the sputtering method, with the same structure as that of the conventional example.

As shown in FIG. 3, the variation of the breakdown voltages in the first embodiment is much smaller than those in the comparative example and the conventional example. The breakdown voltages in the first embodiment are further improved in comparison with those in the comparative and conventional examples. When the delamination occurs in the EL device, the threshold voltage is lowered. Therefore, it is apparent that delamination of layers does not take place in the EL devices in the first embodiment. In the conventional example, the breakdown in the almost EL devices started when the applied voltage exceeded the threshold voltage by 40–60 V. In the first embodiment, however, even when the applied voltage was 100 V greater than the threshold voltage, any breakdown in the all EL devices did not start.

Figure 4:
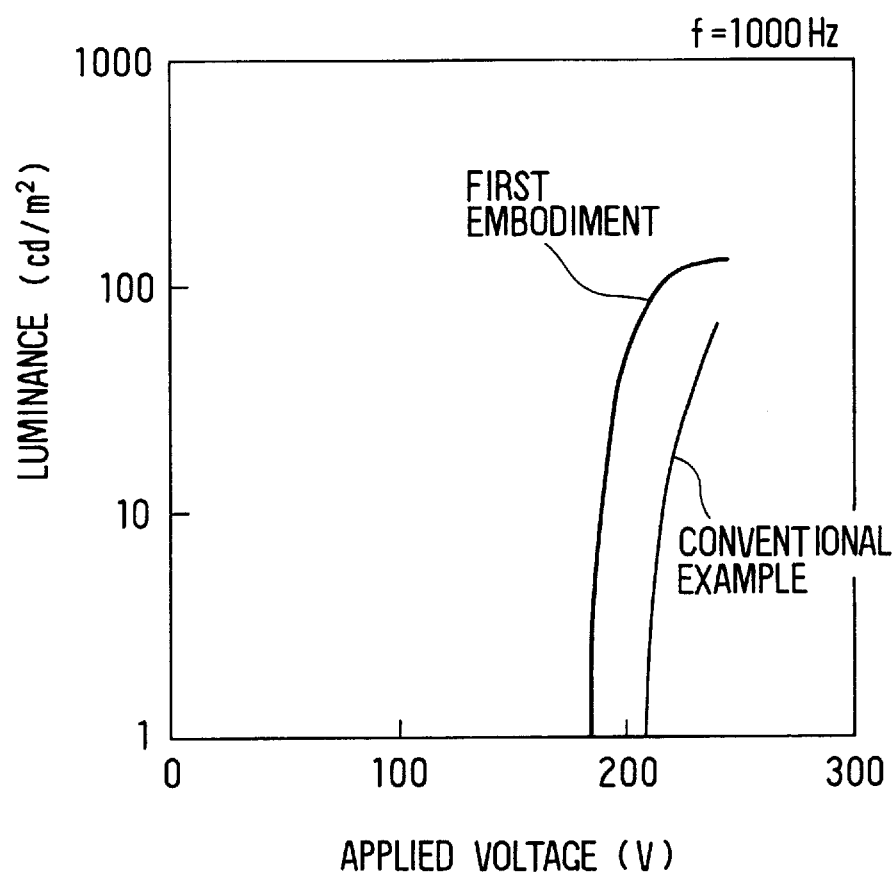
FIG. 4 is a graph showing luminance versus applied voltage characteristics of the EL device in the first embodiment.

Further, luminance characteristics in the first embodiment and in the conventional example are shown in FIG. 4. In the first embodiment, the whole luminescent layer 4 contributes to the luminescence, whereas the luminescent layer in the conventional example includes two layers of ZnS which do not contribute to the luminescence. Therefore, in the first embodiment, the threshold voltage is lower and the luminance is higher than those in the conventional example.

Figure 5:
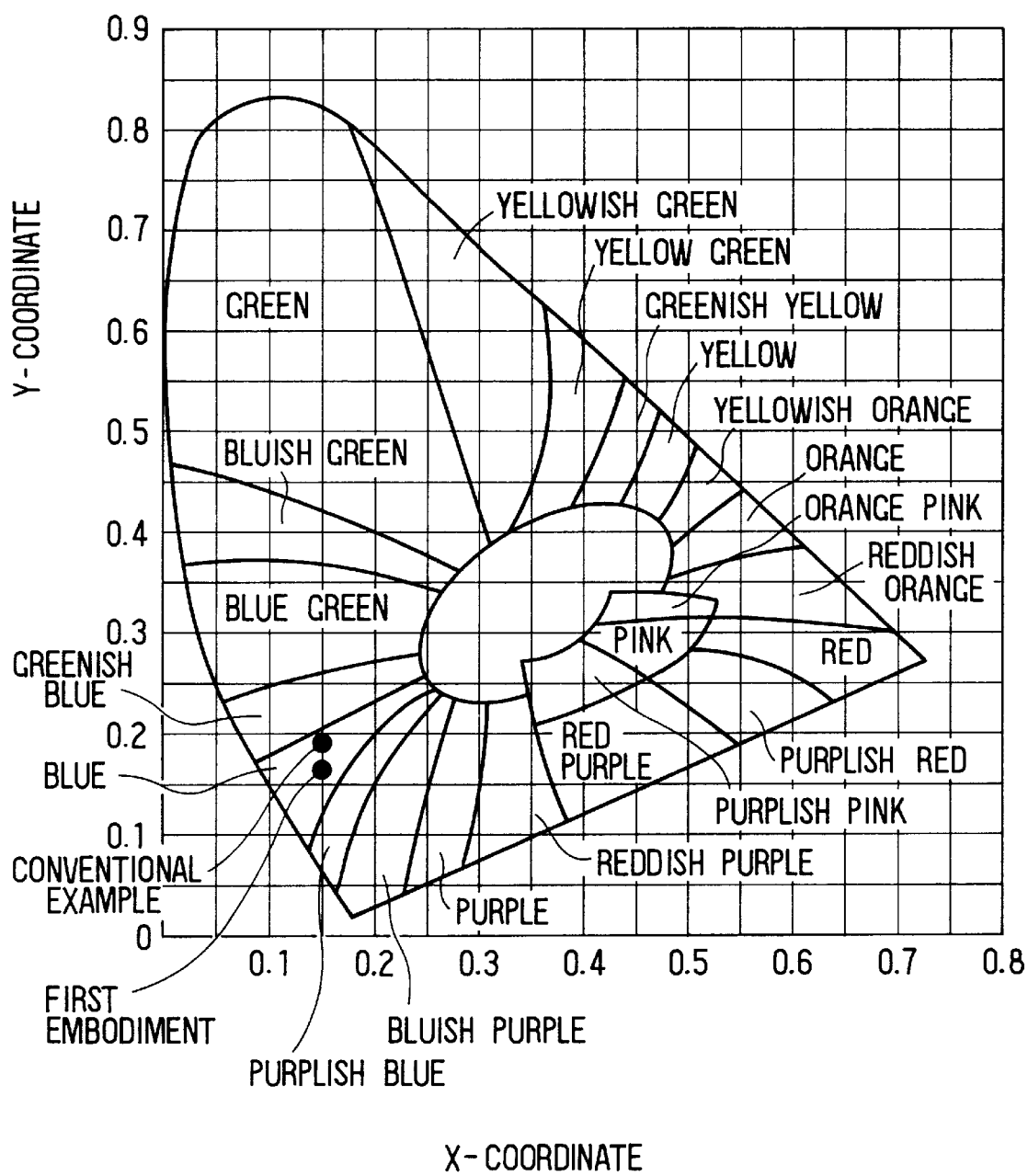
FIG. 5 is a graph comprising a Kelly chart showing the chromaticity of light produced by the EL device in the first embodiment.

Furthermore, as shown in FIG. 5, in the conventional example, the CIE chromaticity coordinates of the emission color of light produced by the EL devices are: X=0.15, and Y=0.19. By contrast, in the first embodiment, they are: X=0.15, Y=0.17, which represents a deeper blue color than that of the conventional example.

Although in the first embodiment the amount of the Ga raw material to be supplied is controlled to change the Ga/Ca ratio in the $CaGa_2S_4$:Ce luminescent layers 4a and 4b, the amount of the Ca raw material to be supplied may be controlled instead of controlling the amount of the Ga raw material.

Further, the luminescent layer 4 may be composed of several pairs of the luminescent layers 4a and 4b. In this case, it is necessary that the luminescent layer 4a having excessive Ga is directly placed on the first insulating layer 3 to prevent the delamination between the luminescent layer 4 and the first insulating layer 3.

The luminescent layer 4a directly formed on the first insulating layer 3 may be a non-dope layer which is not doped with Ce. At the beginning of the growth of $CaGa_2S_4$:Ce, calcium sulfide (CaS) as a by-product tends to be grown, and crystalinity of the $CaGa_2S_4$:Ce luminescent layer 4 is lowered by the growth of CaS. However, in the case that the non-dope layer having the same material as the host material of the luminescent layer 4 is formed on the first insulating layer 3, it prevents the growth of CaS and improves the crystalinity of the whole luminescent layer 4, though the non-dope layer itself does not contribute to the luminescence.

A ZnS layer may be placed only between the luminescent layer 4 and the second insulating layer 5 to prevent the delamination between the luminescent layer 4 and the second insulating layer 5. Although the existence of the ZnS layer results in an increase of the threshold voltage, the degree of the increase is smaller than that in the conventional example having a pair of the ZnS layers.

In this first embodiment, a blue color purity of the luminescent light is improved. In addition to this effect, it is possible to improve red and green color purities by selecting adequate materials for the luminescent layers.

Next, a second embodiment will be described.

Figure 6:
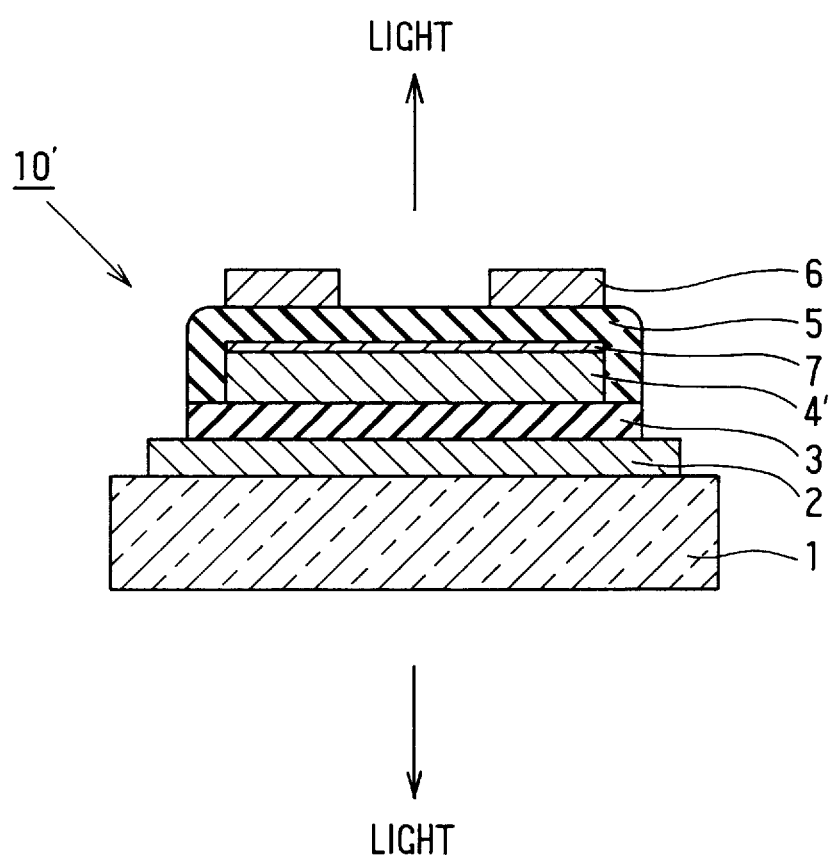
FIG. 6 is a cross-sectional view showing an EL device in a second embodiment.

FIG. 6 shows an EL device 10' as the second embodiment. In place of the luminescent layers 4a and 4b of the first embodiment, the Ga/Ca ratios of which are different from each other, a luminescent layer 4' is adopted in the second embodiment. The Ga/Ca ratio in the luminescent layer 4' is continuously increased from its surface close to the second insulating layer 5 toward the other surface close to the first insulating layer 3.

In the second embodiment, a ZnS layer 7 is deposited on the luminescent layer 4', thereby further preventing the delamination between the luminescent layer 4' and the second insulating layer 5. As in the first embodiment, the ZnS layer 7 may be eliminated.

The luminescent layer 4' is formed in the following manner.

The luminescent layer 4' is deposited by the MOCVD method as in the first embodiment. First, pressure in the forming chamber is controlled at 50 Torr, while temperature of the glass substrate 1 on which the first electrode 2 and the first insulating layer 3 are formed is maintained at 540° C. $Ca(C_{11}H_{19}O_2)_2$, $Ga(C_2H_5)_3$, $H_2S$ and $Ce(C_{11}H_{19}O_2)_3$ are respectively used as raw materials of Ca, Ga, S and Ce as in the first embodiment. The source gases of $H_2S$, $Ga(C_2H_5)_3$ and $Ca(C_{11}H_{19}O_2)_2$ are introduced into the forming chamber in this order. Then, $Ce(C_{11}H_{19}O_2)_3$ are introduced, whereby $CaGa_2S_4$:Ce luminescent layer is formed. At the beginning of the deposition, the Ga/Ca ratio in the luminescent layer 4' is controlled to be in the range of approximately 2.8–3.0, so that the $CaGa_2S_4$:Ce thin film formed at the beginning of the deposition includes excessive Ga and S compared with the stoichiometric composition.

Thereafter, a flow rate of a carrier gas for introducing the Ga source gas into the forming chamber is gradually lowered to decrease the amount of the Ga to be supplied. Accordingly, the Ga/Ca ratio in the $CaGa_2S_4$:Ce luminescent layer 4' is gradually and continuously decreased. The Ga/Ca ratio is further controlled to be in the range of 2.2–2.4.

Figure 7:
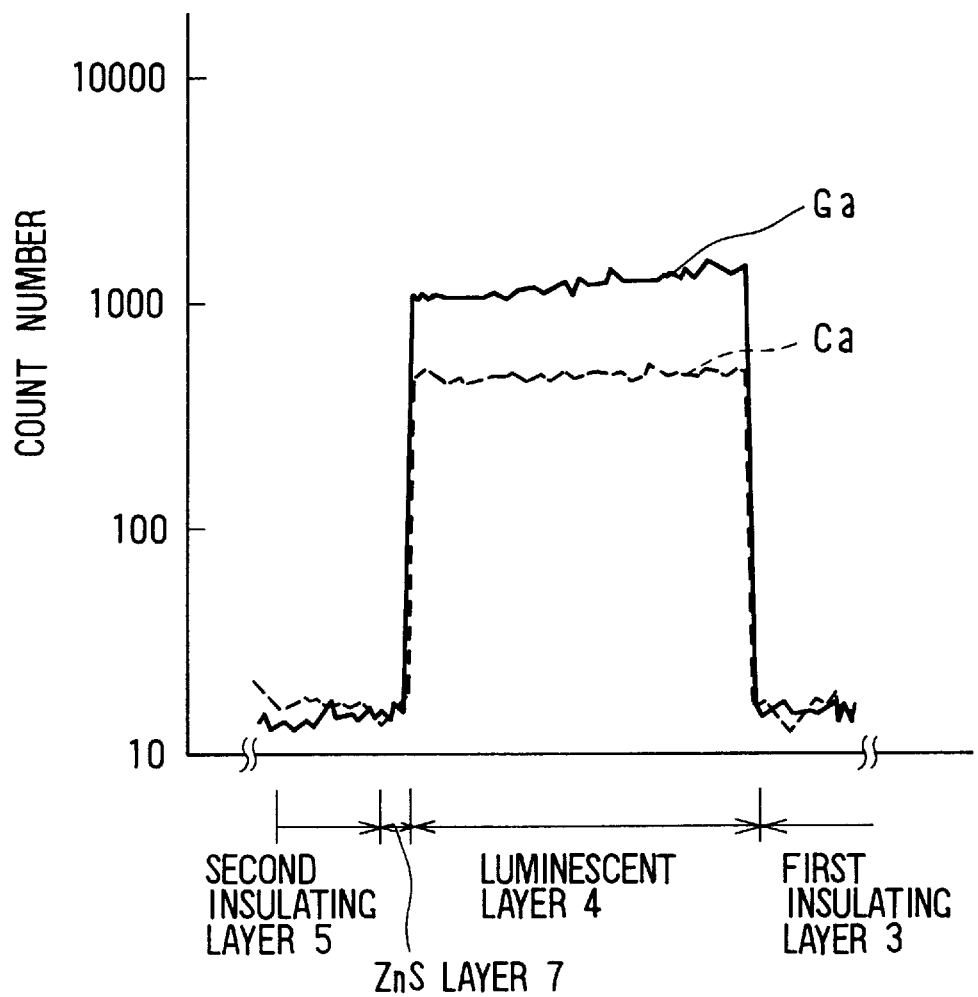
FIG. 7 is a graph showing amounts of Ga and Ca, analyzed by SIMS, in the EL device in the second embodiment.

The amounts of Ca and Ga in the luminescent layer 4', measured by SIMS, are shown in FIG. 7. The Ga/Ca ratio in the luminescent layer 4' continuously decreases from the first insulating layer side to the second insulating layer side. According to the measurement, the Ga/Ca ratio in the luminescent layer 4' close to the first insulating layer was around 2.8–3.0, and the Ga/Ca ratio in the luminescent layer 4' close to the second insulating layer was around 2.1–2.2. The thickness of the luminescent layer was approximately 500 nm.

Next, the ZnS layer 7 is placed on the $CaGa_2S_4$:Ce luminescent layer 4'. Concretely, diethylzinc $(Zn(C_2H_5)_2)$ as a raw material of zinc (Zn) and $H_2S$ as a raw material of S are introduced into the forming chamber in which a glass substrate 1 is kept at a constant temperature, 450° C., and under a pressure of 2 Torr, whereby the thin film ZnS layer 7 is deposited on the luminescent layer 4'.

In this state, since the luminescent layer 4' has an amorphous structure, the layer 4' does not emit light. Therefore, thermal annealing is performed for 1 min. at 650° C. in an atmosphere containing 20% of $H_2S$ to crystallize the luminescent layer 4'.

Thereafter, the second insulating layer 5 and the second electrode 6 are formed in the same way as in the first embodiment.

Figure 8:
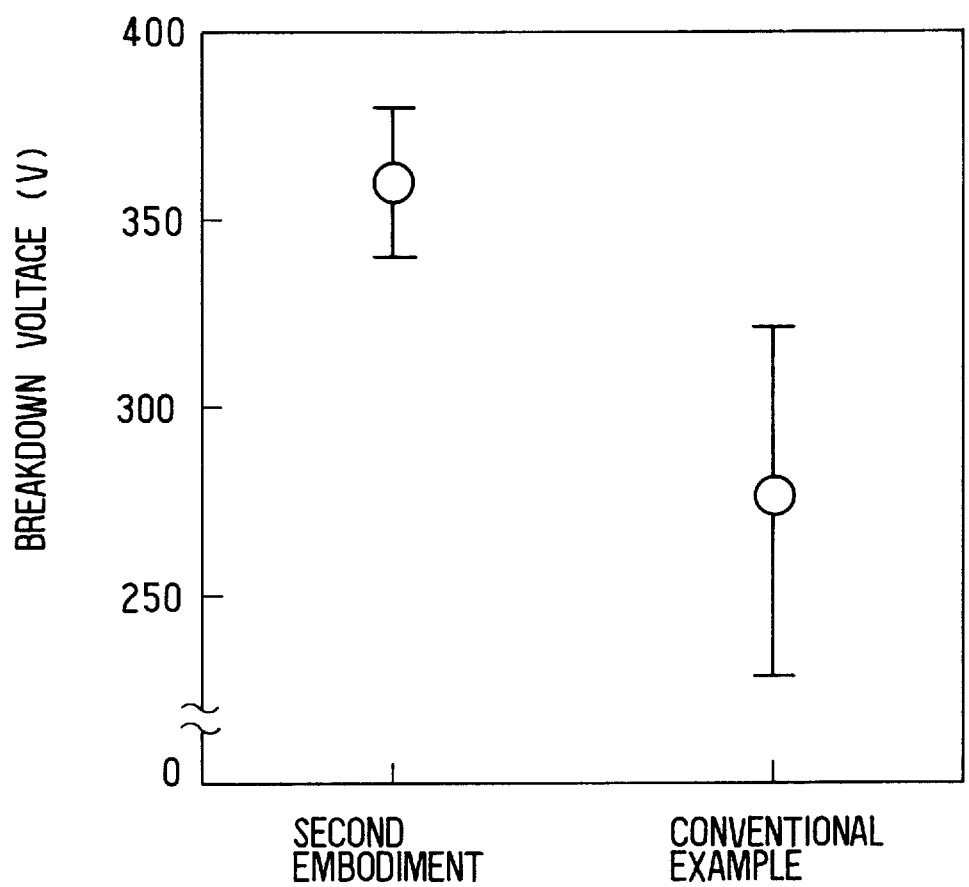
FIG. 8 is a graph showing breakdown voltages of the EL devices in the second embodiment in comparison with those in the conventional example.

The breakdown voltages of thus produced EL devices 10' are shown in FIG. 8. The breakdown voltages in the second embodiment are greatly improved, too, as in the first embodiment in comparison with those in the conventional example.

The effect upon luminance of the EL devices 10' is shown in FIG. 9. The EL device 10' can generate high luminance and can be driven with a lower voltage compared to the conventional example. Compared to the first embodiment, the threshold voltage in the second embodiment is higher. It is considered that this is caused by the existence of the ZnS layer 7.

Although in the foregoing embodiments the luminescent layers are composed of $CaGa_2S_4$:Ce, it is possible to substitute other elements for Ca, Ga, S, and Ce. In place of Ca, an element of the group II can be selected from the group consisting of strontium (Sr), barium (Ba) and Zn, and in place of Ga, an element of the group III can be selected from the group consisting of aluminium (Al) and indium (In). Further, an element of the group VI can be selected from the group consisting of selenium (Se) and tellurium (Te) in place of S.

Further, as the luminescent center, an element selected from the group consisting of manganese (Mn) and europium (Eu) can be adopted in place of Ce.

In the case that a luminescent layer composed of strontium thiogallate doped with Ce($SrGa_2S_4$:Ce) is used in the EL device, it has been confirmed that the same effects is attained as those in the foregoing embodiments.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electroluminescent device having at least one transparent surface for emitting light comprising:

a substrate;

a first electrode disposed on the substrate;

a first insulating layer disposed on the first electrode;

a luminescent layer disposed on the first insulating layer, and composed of a group-II-III-VI compound acting as a host material and an element acting as a luminescent center;

a second insulating layer disposed on the luminescent layer; and a second electrode disposed on the second insulating layer; wherein an atomic ratio of an element of the group III to an element of the group II of the host material compound in the luminescent layer is higher at the first insulating layer side and lower at the second insulating layer side.

2. An electroluminescent device according to claim 1, wherein the luminescent layer includes a first and a second luminescent layer, the first luminescent layer being disposed at the first insulating layer side, having said atomic ratio which is higher than that in the second luminescent layer and including no luminescent center.

3. An electroluminescent device according to claim 1, wherein the luminescent layer includes a first and a second luminescent layer, both being doped with a luminescent center, and the first luminescent layer is disposed at the first insulating layer side and has said atomic ratio which is higher than that in the second luminescent layer.

4. An electroluminescent device according to claim 1, wherein said atomic ratio in the luminescent layer is continuously changed throughout its thickness.

5. An electroluminescent device according to claim 2 or 3, wherein the first and the second luminescent layers are made of the same material.

6. An electroluminescent device according to claim 3, wherein the first and the second luminescent layers are made of the same host material and are doped with the same luminescent center element.

7. An electroluminescent device according to claim 6, wherein the host material is $CaGa_2S_4$ and the luminescent center element is Ce.

8. An electroluminescent device according to claim 2 or 3, wherein said atomic ratio in the second luminescent layer is approximately stoichiometric.

9. An electroluminescent device according to claim 7, wherein said atomic ratio in the first luminescent layer is in a range of 2.8–3.0, and said atomic ratio in the second luminescent layer is in a range of 2.1–2.3.

10. An electroluminescent device according to claim 1, wherein the element of the group II is an element selected from a group consisting of Ca, Sr, Ba and Zn, the element of the group III is an element selected from a group consisting of Ga, Al and In, and the element of the group VI is an element selected from a group consisting of S, Se and Te.

11. An electroluminescent device according to claim 2 or 3, wherein the first luminescent layer is thinner than the second luminescent layer.

* * * * *